Dec. 28, 1926.

A. STEINLE 1,612,071

THREAD TESTING DEVICE

Filed May 11, 1923

Inventor:
Adolf Steinle

Patented Dec. 28, 1926.

1,612,071

UNITED STATES PATENT OFFICE.

ADOLF STEINLE, OF JENA, GERMANY, ASSIGNOR TO THE FIRM CARL ZEISS, OF JENA, GERMANY.

THREAD-TESTING DEVICE.

Application filed May 11, 1923, Serial No. 638,315, and in Germany May 15, 1922.

The present invention relates to a device for testing the pitch of threads which is of the following construction. Two slides displaceable parallel to the axis of the thread to be tested are freely movable and independently of each other in the direction of this axis. Each of the two slides carries a testing member to be inserted into the thread, each of which testing members is rigidly connected with the appertaining slide in the direction of the screw-axis and which both lie in the same plane containing the screw-axis. In addition, each of the two slides has a stop surface in such a way that it is possible to insert between these two stop surfaces parallel to the thread-axis a gauge, whose length corresponds to a multiple of the required measure of the pitch. With a view to being able to read off at once the difference existing at any one time between the actual pitch-value and the corresponding length of the gauge used, either the stop surface of the one slide or the one end surface of the gauge used appertains to an elastic testing body which actuates a rotatable pointer. If both stop surfaces be rigidly disposed on their slides, use is made of a gauge having a testing arrangement in which the one end surface is formed by a testing body under spring tension, the displacement of which relatively to the body of the gauge may be read off on a rotatable pointer. If, conversely, it be desired to use in lieu of the testing gauge an end gauge of fixed length, corresponding to the amount of the pitch at any one time, it is necessary to fit on the one slide instead of a fixed stop a testing body under spring tension, the motion of which body relatively to the slide is again transmitted to a rotatable pointer. Hence, when measuring, it is simply necessary to bring the respective thread in contact, with the two testing members, whereupon, on the corresponding gauge having been inserted between the stop surfaces of both slides, the error of the pitch may be easily read off.

Figure 1:
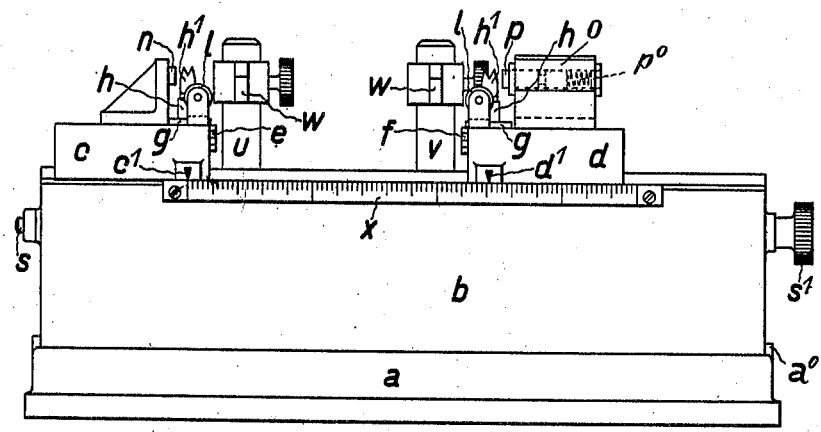
Figure 2:
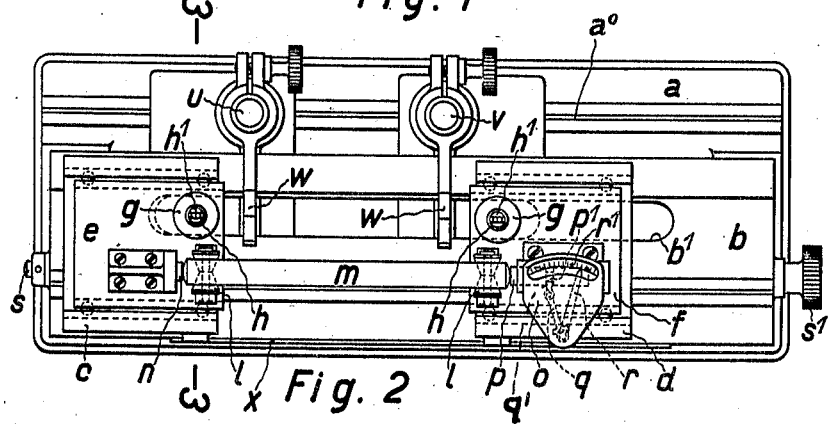
Figure 3:
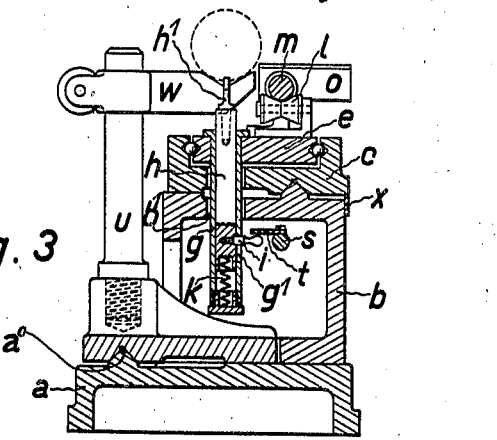

The annexed drawing shows a constructional example of the invention. Fig. 1 is a front view of the device, Fig. 2 is a plan and Fig. 3 is a section on the line 3—3 of Fig. 2.

On a base plate $a$ is fixed a rectangular hollow cast-body $b$, the top of which is constructed as a horizontal guide for two slides $c$ and $d$ displaceable parallel to the longitudinal direction of the body $b$. Each of the two slides $c$ and $d$ carries a second, somewhat smaller slide $e$ and $f$, respectively, both of which have the same direction of displacement as the slides $c$ and $d$ and are capable of gliding with very slight friction by the use of ball bearings on the bottom slide. On each of the two slides $e$ and $f$ is fixed a vertical sleeve $g$ in which a bolt $h$ is guided. A pin $i$ laterally inserted into the bolt $h$ and gliding in a corresponding slit $g^1$ of the sleeve $g$, prevents a rotation of the bolt $h$ about its axis and simultaneously confines its play. The bolt $h$ is continuously pressed upwards by a spring $k$. Into a conical bore at the top of each bolt $h$ there is inserted an interchangeable testing pin $h^1$. In order that the sleeve $g$ projecting downwardly into the interior of the hollow body $b$ does not prevent a displacement of the slide $c$ and $d$, a corresponding opening $b^1$ is provided in the guide-bed of the body $b$. Beside the sleeve $g$ there is provided on each of the two slides $e$ and $f$ a guide roller $l$, having a horizontal axis of rotation upon which the gauge used for the measurement is to be placed. In the present example it is assumed that as a gauge there is used an end gauge $m$ of fixed length (for clearness' sake this end gauge is not shown in Fig. 1). The slide ($e$) carries therefore a stop $n$ rigidly connected therewith, whilst on the slide ($f$) there is supported within a casing $o$ screwed to it a testing member $p$, which is displaceable parallel to the axis of the end gauge $m$ and which is continuously pressed towards the end gauge by a spring $p^0$.

The displacements of the testing member $p$ relatively to its casing $o$ are transmitted by means of a lever $q$, which is supported within the casing $o$ and engages with its shorter arm in a groove $p^1$ of the testing member $p$ and further carries on its longer arm a toothed wheel-segment $q^1$ to a rotatable pointer $r$, the position of which can be read off on a scale $r^1$ fixed on the top of the casing $o$. Inside the body $b$ there is a shaft $s$, running parallel to the longitudinal direction of this body and capable of being rotated through a small angular amount by means of a button $s^1$ disposed on the right-hand side of the device. The shaft $s$ is connected to a rail $t$ (see Fig. 3), which extends over the whole range of displacement of the slides *c* and *d* and overlaps the projecting spherical ends of the two pins *i*, so that in any position of the slides *c* and *d* it is possible to press downwards the two testing pins $h^1$ by rotating the button $s^1$. On the base plate *a* there are further disposed two standards *u* and *v* which are displaceable on the base plate *a* along a guide $a^0$ and may slide parallel to the connecting line of the two testing pins and serve for receiving the body to be tested. It is assumed that in the present case it is bolt threads which are to be tested. Each of the two standards *u* and *v* is therefore provided with a carrying arm *w*, adjustable in height and having a V-shaped supporting surface. With a view to being able to quickly adapt the distance apart of the two slides *c* and *d* to the amount of pitch to be tested, the body *b* is provided with a scale *x*, whilst each of the slides *c* and *d* carries a corresponding pointer $c^1$ and $d^1$ respectively.

The above described device is used in the following manner. The standards *u* and *v* and their two carrying arms *w* are so adjusted according to the dimensions of the bolt to be tested that with raised rail *t* the two testing pins $h^1$ properly mesh with the thread. Thereupon, with disengaged testing pins the distance apart of the two slides *c* and *d* is adjusted so as to approximately correspond to the amount of pitch to be tested, and the suitable end gauge inserted between the stops *n* and *p*. Now nothing is left to be done but to place the respective bolt upon the carrying arms *w* and to lift off the rail *t*. The two testing pins then engage in the thread, the slides *e* and *f* automatically displacing a little, if necessary, relatively to the slides *c* and *d*. Any existing error of pitch is then indicated on the scale $r^1$ by the pointer *r*. Hence, the device will be of special importance if a larger number of like bolts are to be tested, since the error is indicated directly after the bolt has been located.

I claim:

1. In a thread-testing device a base, two slides on said base movable towards and away from each other, two testing pins, each of which is fitted to one of the said slides and adapted to mesh with the thread to be tested, two carriers adapted to support an end gauge, each of which carriers being fixed on one of the said slides, one of the said slides having a stop surface fixed relatively thereto and being adapted to rest against one end of said end gauge supported by the said carriers, a testing member movably disposed on the other slide and adapted to rest against the other end of said end gauge, an indicator including a scale and a pointer and operative connections between said testing member and said indicator.

2. In a device according to claim 1, at least one of the said two slides being supported on a slide on said base and adjustable in the same direction as the slide it supports.

3. In a device according to claim 1, springs adapted to press the said testing pins against the thread to be tested.

4. In a thread-testing device a base, two slides on said base movable towards and away from each other, two testing pins, each of which is fitted to one of the said slides and adapted to mesh with the thread to be tested, springs adapted to press the said testing pins against the thread to be tested, a rail disposed parallel to the direction of displacement of the said slides and acting upon the said two testing pins, this rail being further pivotally mounted about an axis parallel to its longitudinal direction and thereby adapted to press away the said two testing pins from the thread to be tested, two carriers adapted to support an end gauge, each of which carriers being fixed on one of the said slides, one of the said slides having a stop surface fixed relatively thereto and being adapted to rest against one end of said end gauge supported by the said carriers, a testing member movably disposed on the other slide and adapted to rest against the other end of said end gauge, an indicator including a scale and a pointer and operative connections between said testing member and said indicator.

ADOLF STEINLE.